(12) United States Patent
Jang et al.

(10) Patent No.: US 8,221,829 B2
(45) Date of Patent: Jul. 17, 2012

(54) PREPARATION OF PRUSSIAN BLUE COATING FILM FOR ELECTROCHROMIC DEVICE

(75) Inventors: Jae Hyeok Jang, Cheonan-si (KR); Seungwon Lee, Seoul (KR); Chang Soo Shin, Cheonan-si (KR)

(73) Assignee: SKC Co., Ltd., Gyeonggi-Do (KR)

( * ) Notice: Subject to any disclaimer, the term of this patent is extended or adjusted under 35 U.S.C. 154(b) by 971 days.

(21) Appl. No.: 12/280,227

(22) PCT Filed: Jan. 30, 2007

(86) PCT No.: PCT/KR2007/000517
§ 371 (c)(1),
(2), (4) Date: Aug. 21, 2008

(87) PCT Pub. No.: WO2007/102656
PCT Pub. Date: Sep. 13, 2007

(65) Prior Publication Data
US 2010/0233356 A1    Sep. 16, 2010

(30) Foreign Application Priority Data
Mar. 6, 2006   (KR) ........................ 10-2006-0020988

(51) Int. Cl.
*B05D 5/12* (2006.01)
(52) U.S. Cl. .................... 427/108; 427/119; 356/265
(58) Field of Classification Search .................. 356/265; 427/108, 119
See application file for complete search history.

(56) References Cited

U.S. PATENT DOCUMENTS

| 4,498,739 A | 2/1985 | Itaya et al. |
| 4,818,352 A | 4/1989 | Inaba et al. |
| 4,855,161 A * | 8/1989 | Moser et al. .................. 427/108 |
| 5,215,821 A | 6/1993 | Ho |
| 2010/0238534 A1* | 9/2010 | Radmard et al. .............. 359/265 |

FOREIGN PATENT DOCUMENTS

| JP | 62-240937 | 10/1987 |
| JP | 63-106732 | 5/1988 |
| JP | 07-072514 | 3/1995 |
| JP | 2006-256954 | 9/2006 |

* cited by examiner

*Primary Examiner* — Linda L Gray
(74) *Attorney, Agent, or Firm* — Frommer Lawrence & Haug LLP; Ronald R Santucci

(57) ABSTRACT

The present invention relates to a method for preparing a Prussian blue coating film for an electrochromic device, more particularly to a method for preparing a Prussian blue coating film for an electrochromic device comprising an electrochromic layer coated on a light transmitting substrate including a coating of a transparent electrode, an ion storage layer coated on another light transmitting substrate including a coating of a transparent electrode and an electrolyte layer formed between the electrochromic layer and the ion storage layer, wherein the ion storage layer is formed with a specific nano-dispersed composition comprising Prussian blue by wet coating, thereby providing comparable or better physical properties, including light transmittance, response time, durability, etc., when compared with the conventional electrochemical techniques, simplifying the manufacturing processes and significantly improving the productivity. With improved economic advantages, the present invention enables the realization of large-sized electrochromic devices.

6 Claims, 3 Drawing Sheets

[Fig. 1]
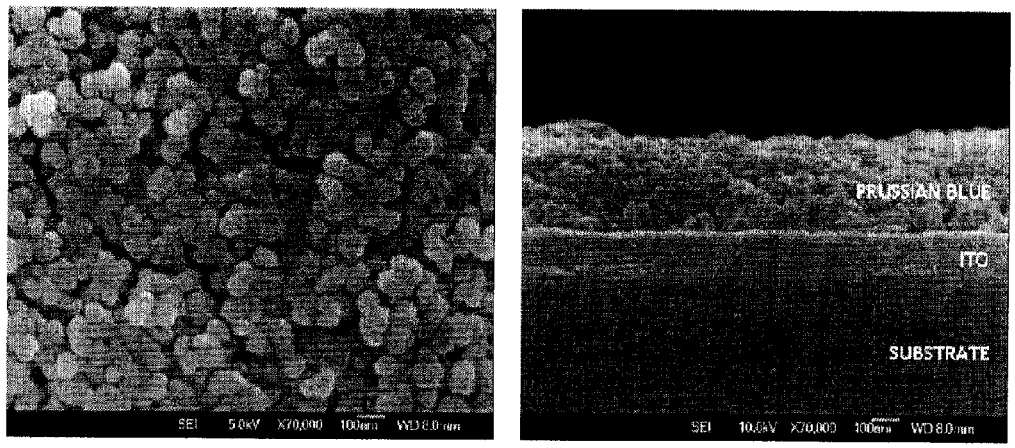
[Fig. 2]
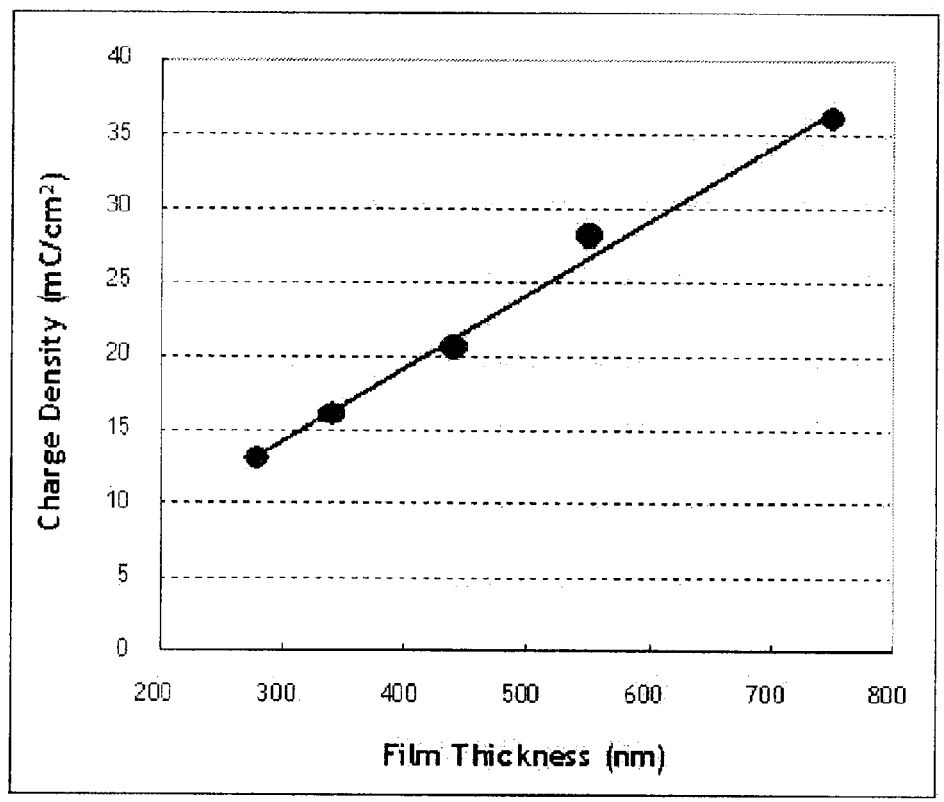

[Fig. 3]
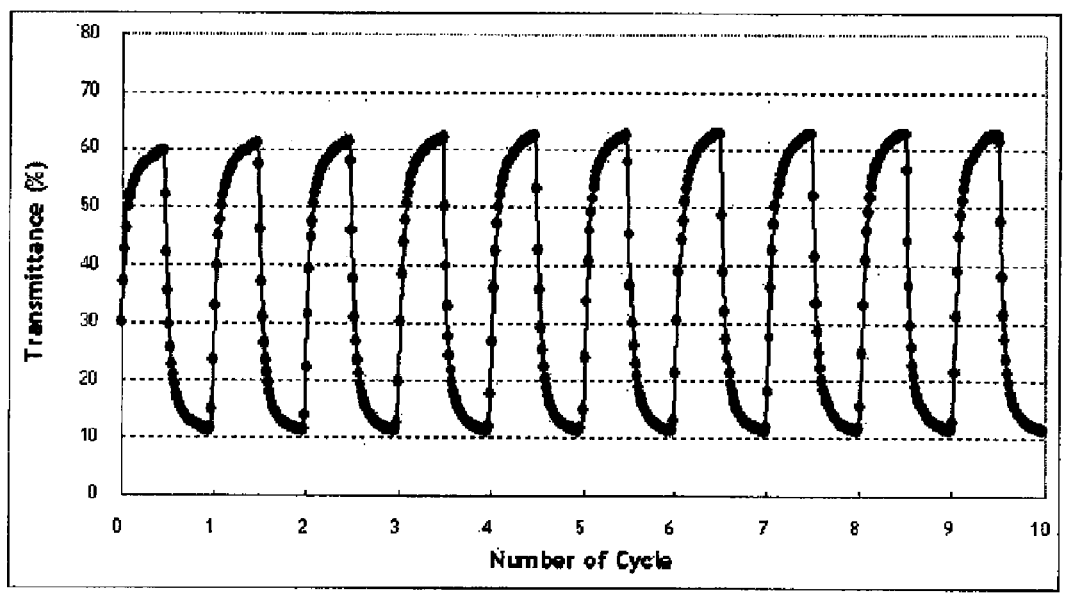
[Fig. 4]
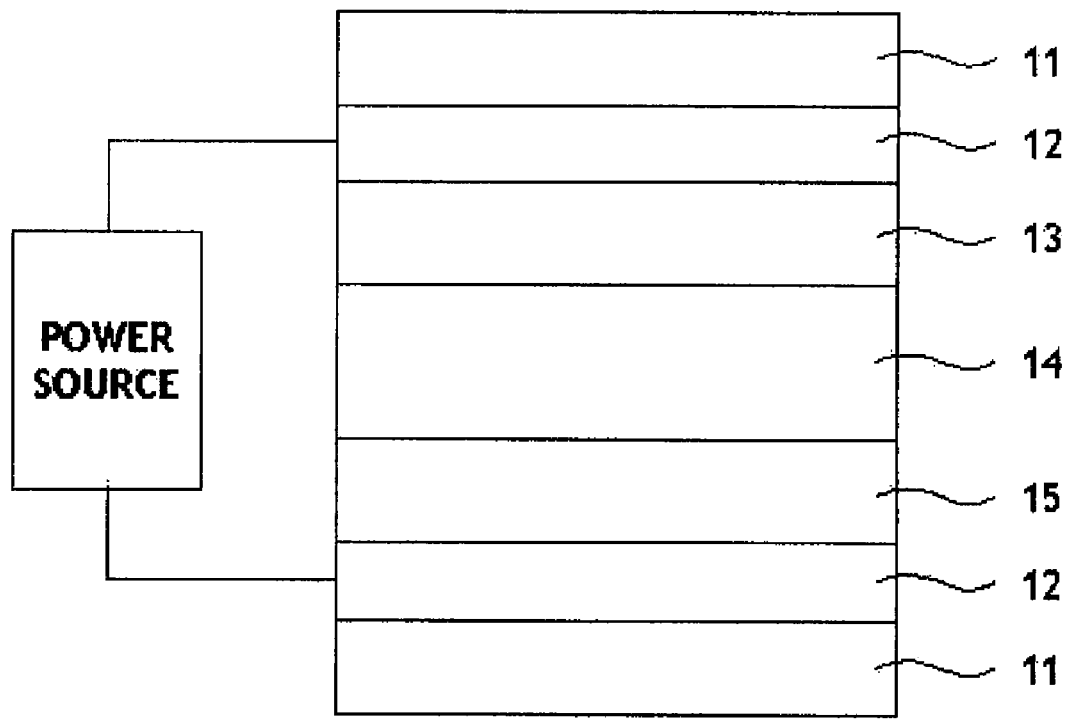

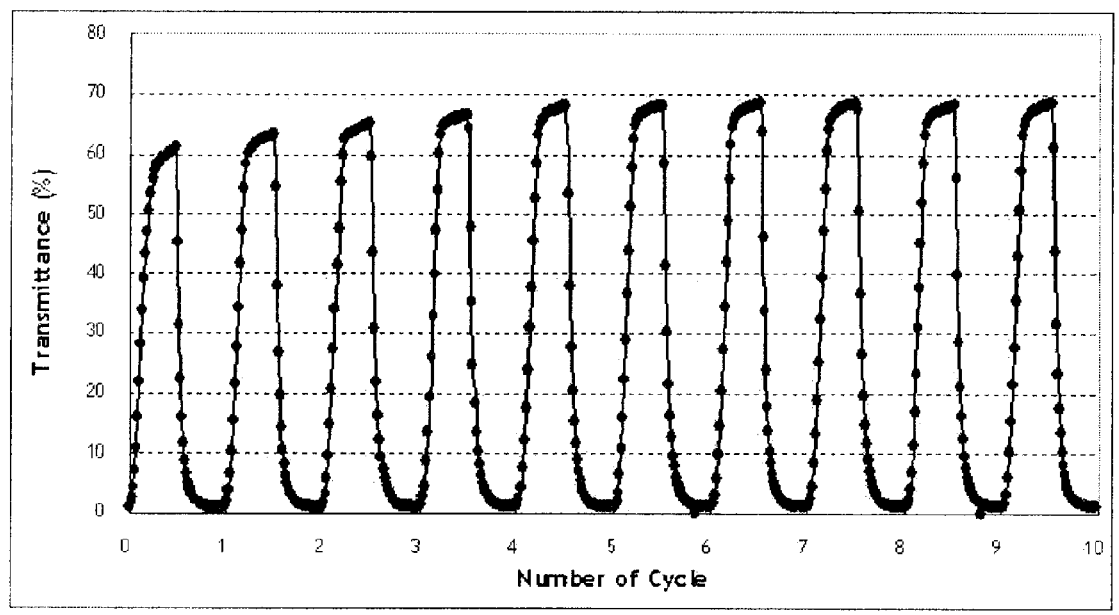
[Fig. 5]

PREPARATION OF PRUSSIAN BLUE COATING FILM FOR ELECTROCHROMIC DEVICE

This application is a 371 of PCT/KR2007/000517 filed on Jan. 30, 2007, published on Sep. 13, 2007 under publication number WO 2007/102656 A1 which claims priority benefits from South Korean Patent Application Number 10-2006-0020988 filed Mar. 6, 2006, the disclosure of which is hereby incorporated by reference.

TECHNICAL FIELD

The present invention relates to a method for preparing a Prussian blue coating film for an electrochromic device, more particularly to a method for preparing a Prussian blue coating film for an electrochromic device comprising an electrochromic layer coated on a light transmitting substrate including a coating of a transparent electrode, an ion storage layer coated on another light transmitting substrate including a coating of a transparent electrode and an electrolyte layer formed between the electrochromic layer and the ion storage layer, wherein the ion storage layer is formed with a specific nano-dispersed composition comprising Prussian blue by wet coating, thereby providing comparable or better physical properties, including light transmittance, response time, durability, etc., when compared with the conventional electrochemical techniques, simplifying the manufacturing processes and significantly improving the productivity. With improved economic advantages, the present invention enables the realization of large-sized electrochromic devices.

BACKGROUND ART

Electrochromic devices, which usually comprise a substrate, a first transparent electrode layer, an electrochromic layer, an electrolyte layer, an ion storage layer, a second electrode layer and a second substrate, are used to control the light transmittance or reflectance of architectural windows or automobile room mirrors. The device uses the principle that an electrochromic material changes its color in response to external electric field. Recently, it has been reported that the electrochromic material can block the infrared as well as it can change colors in the visible light region, its application to be used to manufacture energy saving products has been spotlighted.

Electrochromic materials are classified into inorganic electrochromic materials and organic electrochromic materials. Representative inorganic electrochromic materials are $WO_3$, $NiO_xH_y$, $Nb_2O_5$, $V_2O_5$, $TiO_2$, $MoO_3$, etc., and representative organic ones are polyaniline, polypyrrole, Prussian blue, etc.

The optical properties of the electrochromic materials can be changed through reduction or oxidation processes. The electrochromic materials are also classified into reduction coloring materials and oxidation coloring materials, depending on the coloring mechanism. By using a suitable reduction coloring material and an oxidation coloring material into the electrochromic layer and the ion storage layer, respectively or vice versa, the characteristics of an electrochromic device can be improved further by complementary effect.

Of the inorganic electrochromic materials, $WO_3$, a typical reduction coloring material, performs color change through a reaction with ions and electrons, as illustrated in Scheme 1 below. The degree of coloring is determined by the amount of electric charge.

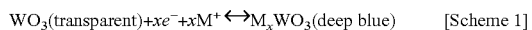

$WO_3(transparent)+xe^-+xM^+ \leftrightarrow M_xWO_3(deep\ blue)$  [Scheme 1]

where x is a reaction coefficient, M is proton (H), lithium (Li), sodium (Na) or potassium (K) ion, typically lithium ion. The electrochromic effect results from the oxidation or reduction reaction of $WO_3$ with the lithium ion. Such inorganic electrochromic material can be prepared by various methods, including vacuum evaporation, ion plating, deposition and sol-gel method.

Of the organic electrochromic materials, Prussian blue, a typical oxidation coloring material, performs color change as illustrated in Scheme 2 below,

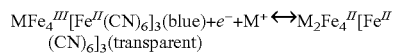

$MFe_4^{III}[Fe^{II}(CN)_6]_3(blue)+e^-+M^+ \leftrightarrow M_2Fe_4^{II}[Fe^{II}(CN)_6]_3(transparent)$

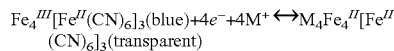

$Fe_4^{III}[Fe^{II}(CN)_6]_3(blue)+4e^-+4M^+ \leftrightarrow M_4Fe_4^{II}[Fe^{II}(CN)_6]_3(transparent)$  [Scheme 2]

wherein M is proton (H), lithium (Li), sodium (Na), potassium (K), rubidium (Rb), cesium (Cs) or ammonium ($NH_4$) ion, most frequently lithium ion.

Typically, the organic electrochromic material is deposited by electroplating.

For Prussian blue, a method of applying an electric field between a substrate to be coated and a counter electrode for a long time in an aqueous solution of potassium ferrocyanide ($K_4Fe(CN)_6$) and ferric chloride ($FeCl_3$) to form a coating film is known [U.S. Pat. No. 4,498,739; U.S. Pat. No. 4,818,352; U.S. Pat. No. 5,215,821]. However, the electroplating method has several fatal drawbacks—the time required for coating increases in proportion to the thickness of the coating film; and the coating process is discontinuous, and thus, is not suitable for large-scale production. Especially, when performing the coating on a large area, the size of the expensive counter electrode should be increased to obtain a uniformly coated film.

When a small-sized counter electrode is used, a non-uniformly coated film is obtained.

DISCLOSURE

The present inventors have made extensive efforts to solve the problems of complicated process, non-uniform coating film, limitation in large-scale production, etc., of the conventional electroplating method of forming the Prussian blue coating film. Wet coating is the most convenient film formation method capable of solving these problems. But, since the Prussian blue pigment particles are insoluble, they are not dissolved in the coating solvent but remain in the form of suspension or precipitates. Therefore, the coating cannot be performed easily. Further, because the size of the particles is in the range of several to dozens of micrometers, a good visibility cannot be attained after the coating.

In the present invention, by dispersing a composition comprising a Prussian blue pigment, a suitable binder, a dispersing agent and a dispersion solvent to a nano size, a satisfactory wet coating has been made possible. Further, by crushing the particles to a size smaller than the wavelength of the visible ray, a good visibility in the visible region is attained. The resulting Prussian blue coating film prepared by the wet coating method has comparable or better electrochromic properties, including light transmittance, response time, durability, etc., when compared with the coating film formed by the conventional electroplating method and offers significantly improved economic advantages through simplified process and improved productivity.

Thus, an object of the present invention is to provide a method for preparing an electrochromic device comprising an ion storage layer obtained by wet coating a Prussian blue containing nano-dispersed composition, having comparable or better electrochromic characteristics, when compared with the conventional electrochromic devices, and being useful for the large-size and large-scale production with simplified process and improved productivity.

The present invention relates to a method for preparing an electrochromic device comprising an electrochromic layer coated on a light transmitting substrate including a coating of a transparent electrode, an ion storage layer coated on another light transmitting substrate including a coating of a transparent electrode and an electrolyte layer formed between the electrochromic layer and the ion storage layer, wherein the ion storage layer is formed by wet coating a Prussian blue containing nano-dispersed composition.

Hereunder is given a detailed description of the present invention.

The present invention relates to a method for preparing an electrochromic device including the ion storage layer which is formed by wet coating a Prussian blue containing nano-dispersed composition.

In general, an electrochromic device comprises a transparent electrode layer (12) and an electrochromic layer (13) formed on an upper substrate (11), a transparent electrode layer (12) and an ion storage layer (15) formed on a lower substrate (11) and an electrolyte layer (14) formed between the electrochromic layer (13) and the ion storage layer (15), as illustrated in FIG. 4. A method is known to form the ion storage layer through an electrochemical process like electroplating using Prussian blue which has oxidation coloring property. In the electroplating process, the substrate to be coated and a counter electrode are aligned in the coating solution and an electric field is applied between them to form the coating film. This process has the following problems—a long coating time is required to obtain a coating film with wanted thickness; since the substrate to be coated has to be replaced, the method is not applicable to the continuous process like roll-to-roll type and large-scale production; and since the concentration of the coating solution changes as the coating proceeds, the adjustment of the concentration is required. Especially, when performing the coating on a large area, the size of the expensive counter electrode has to be increased to obtain a uniform coating film. When a small-sized counter electrode is used, a non-uniform coating film is obtained. Further, the electroplating method requires a special equipment for supplying uniform electric field between the substrate to be coated and a counter electrode. And, since the Prussian blue pigment particles are insoluble in general, they are not dissolved in the coating solvent but remain in the form of suspension or precipitates. Thus, the coating cannot be performed easily and, since the size of the particles is in the range of several to dozens of micrometers, a good visibility cannot be attained after the coating.

In contrast, the present invention offers superior coating property to the insoluble Prussian blue pigment particles by mixing them with a suitable binder. Further, through nano-dispersing of a composition comprising a dispersing agent and a dispersion solvent, the pigment particles were crushed finely to attain a good visibility. For the binder, at least one selected from the group consisting of an organic binder, inorganic binder and organic-inorganic hybrid binder, which are commonly used in the related art, preferably an electrochemically stable polymer having superior adhesion property is used. For the dispersing agent, one compatible with Prussian blue is preferable for uniform and stable nano-dispersion. And, for the dispersion solvent, one capable of dissolving the binder and the dispersing agent is preferred.

Accordingly, in the present invention, an ion storage layer in which the Prussian blue pigment is uniformly nano-dispersed is obtained by wet coating without special equipments. The wet coating method is economically advantageous over the electroplating method in that the process is simple and the productivity can be maximized.

The Prussian blue containing nano-dispersed composition used in the present invention to form the ion storage layer comprises 100 parts by weight of a Prussian blue pigment, 0.01-1,000 parts by weight of a dispersing agent, 0.01-1,000 parts by weight of a binder and 100-20,000 parts by weight of an organic solvent.

The dispersing agent is used to uniformly disperse the pigment and the binder. Although not particularly limited as long as it is one commonly used in the related art, specific examples of the dispersing agent that can be used in the present invention include polyacryl-, polyethyleneimine- and polyurethane-based dispersing agents.

The dispersing agent is used in 0.01-1,000 parts by weight of, preferably in 0.1-100 parts by weight, per 100 parts by weight of the Prussian blue pigment. If its content is slight, an effective dispersion is difficult. In contrast, if it is excessive, the electrochromic characteristics may not be good.

For the binder, at least one selected from an organic binder, inorganic binder and organic-inorganic hybrid binder commonly used in the related art, preferably an electrochemically stable polymer having superior adhesion property is used. And, one having superior ion conductivity is preferred for better response time and one that is without side reactions with ions during the operation of device is preferred for better durability. The organic binder may be a thermosetting resin, thermoplastic resin, etc. Examples of the thermosetting resin include unsaturated polyester resin, epoxy resin, diallyl phthalate resin, phenol resin, amino resin, polyimide resin, urethane resin, etc. And, examples of the thermoplastic resin include polyester, styrene polymer, polyolefin, vinyl chloride polymer, polyurethane, acryl polymer, polycarbonate, butyral resin, polyimide, polyamide, etc.

And, the inorganic binder may be silicon oxide, aluminum oxide, titanium oxide, tungsten oxide, manganese oxide, vanadium oxide, cerium oxide, etc. The organic-inorganic hybrid binder is a compound of an organic binder and an inorganic binder. A silica polymer like organoalkoxysilane obtained from the hydrolysis of an organosilicon compound is a typical example.

The binder is used in 0.01-1,000 parts by weight, preferably in 0.1-100 parts by weight, per 100 parts by weight of the Prussian blue pigment. If its content is slight, a substantial coating adhesion property may not be attained. In contrast, if it is excessive, the final product may have poor electrochromic characteristics.

For the organic solvent, one commonly used in the related art, preferably, one capable of dissolving the composition of the present invention is used. The organic solvent may be selected from a group consisting of an alcohol, ether, ketone, ester, aromatic hydrocarbon, etc. More specifically, methanol, ethanol, propanol, butanol, hexanol, cyclohexanol, diacetone alcohol, furfuryl alcohol, ethylene glycol, diethylene glycol, glycerine, diethyl ether, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, acetone, methyl ethyl ketone, acetyl acetone, methyl isobutyl ketone, cyclohexanone, acetoacetate ether, methyl acetate, ethyl acetate, n-propyl acetate, i-butyl acetate, benzene, toluene, xylene, etc., may be used.

More preferably, a highly volatile solvent is used, because the solvent needs to be sufficiently dried following the coating even at low temperature.

The organic solvent is used in 100-20,000 parts by weight, preferably in 500-5,000 parts by weight, per 100 parts by weight of the Prussian blue pigment. If its content is slight, the dispersion composition becomes too viscous while if it is excessive, a large space is required for storing the composition.

The Prussian blue containing nano-dispersed composition may be obtained by dispersing the Prussian blue pigment in the organic solvent along with the dispersing agent and the binder resin. A dispersing machine commonly used in the related art may be used to disperse each of the components in the organic solvent. More specifically, a kneader, roll mill, attritor, super mill, dissolver, homogenizer, sand mill, etc., may be used.

The resultant Prussian blue containing nano-dispersed composition is wet-coated on a substrate including a coating of a transparent electrode to form the ion storage layer. Specifically, the wet coating is performed by spin coating, dip coating, bar coating, spray coating, flow coating, capillary coating, roll coating, screen printing, etc. The wet coating is performed at room temperature. The drying temperature following the coating should be higher than the temperature at which the solvent is evaporated and lower than the temperature at which Prussian blue is thermally decomposed.

The resultant ion storage layer has an average particle size of 10-200 nm and a coating thickness of 50-1,000 nm. If the average particle size is smaller, the electrochromic characteristics will be improved because of increased specific surface area, but the solution stability will decrease significantly because of increased surface energy. In contrast, if the average particle size is too large, the film cannot be used for an electrochromic device because of poor visibility. The required coating thickness varies depending on the charge capacity of the electrochromic layer. In contrast, if the coating thickness is smaller than 50 nm, the electrochromic characteristics worsen significantly because of poor ion storage capacity.

Further, if the coating thickness exceeds 1,000 nm, the electrochromic characteristics will be deteriorated because of the poor electron conduction by insulating property of the composition.

DESCRIPTION OF DRAWINGS

FIG. 1 shows the scanning electron microscope (SEM) images of the surface and cross-section of the wet-coated Prussian blue film in Example 1.

FIG. 2 shows the amount of ion storage with the thickness of the Prussian blue coating film of Example 1.

FIG. 3 shows the change of light transmittance of the visible ray when oxidation and reduction were performed repeatedly on the wet-coated Prussian blue film in Example 1 using half cell reactions.

FIG. 4 schematically shows the structure of the conventional electrochromic device.

FIG. 5 shows the change of light transmittance of the visible ray during the coloring and bleaching of the electrochromic device comprising the wet-coated Prussian blue film in Example 1.

BEST MODE

Practical and presently preferred embodiments of the present invention are illustrative as shown in the following examples. However, it will be appreciated that those skilled in the art may, in consideration of this disclosure, may make modifications and improvements within the spirit and scope of the present invention.

Example 1

0.65 g of Prussian blue pigment powder (Aldrich, 99.9%) was mixed with 0.13 g of Disperbyk-2001 (BYK), an acryl-based dispersing agent, 0.33 g of silica sol, an inorganic binder, and 11 g of ethanol, an organic solvent, and dispersed using a shaker (Red Devil) to obtain a nano-dispersed composition.

ITO glass having a surface resistance of 10 $\Omega$/sq was cut to a size of 5×5 cm$^2$, washed and dried. Then, the Prussian blue coating solution was spin coated at 1,000 rpm for 30 seconds. After the thermal treatment at 150° C. for 30 minutes, a Prussian blue coating film was obtained. The resultant Prussian blue coating film had a thickness of about 340 nm.

Example 2

The Prussian blue nano-dispersed composition prepared in Example 1 was dip-coated to obtain a film.

ITO glass having a surface resistance of 10 $\Omega$/sq was cut to a size of 5×5 cm$^2$, washed and dried. Then, the Prussian blue coating solution was dip coated at a rate of 150 mm/min. After the thermal treatment at 150° C. for 30 minutes, a Prussian blue coating film was obtained. The resultant Prussian blue coating film had a thickness of about 280 nm.

Example 3

The Prussian blue nano-dispersed composition prepared in Example 1 was bar coated to obtain a film.

ITO glass having a surface resistance of 10 $\Omega$/sq was cut to a size of 5×5 cm$^2$, washed and dried. Then, a suitable amount of the Prussian blue coating solution was applied and bar coating was performed at a rate of 2 m/min using Mayer Bar No. 3. After the thermal treatment at 150° C. for 30 minutes, a Prussian blue coating film was obtained. The resultant Prussian blue coating film had a thickness of about 380 nm.

Comparative Example

A Prussian blue coating film was prepared by the conventional electroplating method.

An aqueous solution was prepared using 0.005 mol of potassium ferrocyanide ($K_4Fe(CN)_6$) and 0.005 mol of ferric chloride ($FeCl_3$). A Prussian blue film was formed on a substrate by applying a constant current of $-20$ $\mu A/cm^2 \cdot sec$ between the substrate and a counter electrode for 500 seconds. The resultant Prussian blue film had a thickness of about 220 nm.

Test Example

Electrochromic devices were prepared using the Prussian blue coating films prepared in Examples 1-3 and Comparative Example. Their characteristics were evaluated and the result is shown in Table 1 below.

In all cases, tungsten oxide was used as an electrochromic material and solid-state polymer electrolyte was used as electrolyte.

50 g of metallic tungsten powder (Aldrich, 99.9%) was dissolved in 235 mL of 30% hydrogen peroxide solution (Aldrich, 30%) by slowly adding dropwise. The solution was stirred for a day at room temperature. Subsequently, the solution was stirred further for 1 hour at 120° C. in order to remove the hydrogen peroxide remaining in the solution and the water, which had been formed as reaction byproduct. After diluting with 200 mL of ethanol, the final coating solution was obtained.

ITO glass having a surface resistance of 10 Ω/sq was cut to a size of 5×5 cm$^2$, washed and dried. Then, the tungsten oxide coating solution spin coated at 3,000 rpm for 30 seconds. After the thermal treatment at 200° C. for 30 minutes, a tungsten oxide coating film was obtained. The resultant tungsten oxide coating film had a thickness of about 300 nm.

A solid-state electrolyte was inserted between the obtained tungsten oxide film and the Prussian blue film to obtain an all-solid-state electrochromic device. For the solid-state electrolyte, a lithium ion conductive silica polymer prepared by the sol-gel method was used.

FIG. 5 shows the change of light transmittance of the visible ray during the coloring and bleaching of the electrochromic device comprising the wet-coated Prussian blue film in Example 1.

Tungsten oxide was used as an electrochromic material and solid-state polymer electrolyte was used as an electrolyte.

A process of bleaching at −1.0 V for 30 seconds and coloring at +1.0 V for 30 seconds was repeated. Change of light transmittance was measured using He—Ne laser with a wavelength of 633 nm. The change of light transmittance was large at about 1-70% and the response time was within 30 seconds. Comparing the result with the change of light transmittance shown in FIG. 3, it can be seen that a larger change of light transmittance was attained thanks to the electrochromic film.

INDUSTRIAL APPLICABILITY

As described above, the Prussian blue coating film prepared by the wet coating method in accordance with the present invention has superior coating property and electrochromic characteristics. Further, since it is possible to form a

TABLE 1

| | Characteristics of Prussian blue film | | | Characteristics of electrochromic device | | |
|---|---|---|---|---|---|---|
| Coating method | Coating time (sec) | Thickness (nm) | Amount of ion storage (mC/cm$^2$) | Change of light transmittance (%) | Response time (sec) | Durability (cycles) |
| Example 1 | 30 | 340 | 16 | 2-70 | ~10 | >10,000 |
| Example 2 | 20 | 280 | 14 | 10-60 | ~10 | >10,000 |
| Example 3 | 2 | 380 | 18 | 1-70 | ~10 | >10,000 |
| Comparative Example | 500 | 220 | 15 | 10-60 | ~10 | >10,000 |

As seen in Table 1, the electrochromic devices of Examples 1-3 prepared by the wet coating method in accordance with the present invention showed comparable or better performances than the electrochromic device of Comparative Example prepared by the conventional electroplating method. More specifically, they showed comparable or better performances in electrochromic characteristics including light transmittance, response time and durability. Besides, they are expected to provide significant economic advantages with a simplified process and improved productivity.

FIG. 1 shows the scanning electron microscope (SEM) images of the surface and cross-section of the wet-coated Prussian blue film in Example 1. The formation of uniform and porous Prussian blue coating film was confirmed and the average particle size was shown to be about 50-60 nm.

FIG. 2 shows the amount of ion storage with the thickness of the Prussian blue coating film of Example 1. The amount of ion storage increased linearly in proportion to the thickness of the coating film. Therefore, it can be seen that, by reducing the average particle size of Prussian blue, a larger amount of ion storage can be attained as the specific surface area increases.

FIG. 3 shows the change of light transmittance of the visible ray when oxidation and reduction were performed repeatedly on the wet-coated Prussian blue film in Example 1 using half cell reactions. Using a platinum electrode as counter electrode and Ag/AgCl as standard electrode, a process of bleaching at −1.0 V for 30 seconds and coloring at +1.0 V for 30 seconds was repeated. Change of light transmittance was measured using He—Ne laser with a wavelength of 633 nm. The light transmittance was about 10% during the coloring and about 60% during the discoloring. The response time was less than 30 seconds.

wider coating film in short time, when compared with the conventional electroplating method, the present invention is expected to offer a significant economic advantage.

Those skilled in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the present invention as set forth in the appended claims.

The invention claimed is:

1. A method for preparing an electrochromic device comprising an electrochromic layer coated on a light transmitting substrate including a coating of a transparent electrode, an ion storage layer coated on another light transmitting substrate including a coating of a transparent electrode and an electrolyte layer formed between the electrochromic layer and the ion storage layer, wherein the ion storage layer is prepared by wet coating a nano-dispersed composition comprising 100 parts by weight of a Prussian blue pigment, 0.01-1,000 parts by weight of a dispersing agent, 0.01-1,000 parts by weight of a binder, and 100-20,000 parts by weight of an organic solvent.

2. The method according to claim 1, wherein the dispersing agent is selected from polyacryl-, polyethyleneimine- and polyurethane-based dispersing agents.

3. The method according to claim 1, wherein the binder selected from an organic binder, an inorganic binder and an organic-inorganic hybrid binder.

4. The method according to claim 1, wherein the organic solvent is selected from an alcohol, an ether, a ketone, an ester and an aromatic hydrocarbon.

5. The method according to claim 1, wherein the wet coating is performed by a method selected from the group consisting of spin coating, dip coating, bar coating, spray coating, flow coating, capillary coating, roll coating and screen printing.

6. The method according to claim 1, wherein the ion storage layer has an average particle size of 10-200 nm and a coating thickness of 50-1,000 nm.

* * * * *